(12) United States Patent
Mian et al.

(10) Patent No.: US 12,717,820 B2
(45) Date of Patent: Aug. 25, 2026

(54) CONVERTING NON-STANDARD DATA INTO A TARGET STANDARD

(71) Applicant: Privacy Analytics Inc., Ottawa (CA)

(72) Inventors: Muhammad Oneeb Rehman Mian, Ottawa (CA); David Nicholas Maurice Di Valentino, Ottawa (CA); George Wesley Bradley, Ottawa (CA)

(73) Assignee: PRIVACY ANALYTICS INC., Ottawa (CA)

( * ) Notice: Subject to any disclaimer, the term of this patent is extended or adjusted under 35 U.S.C. 154(b) by 0 days.

(21) Appl. No.: 18/985,863

(22) Filed: Dec. 18, 2024

(65) Prior Publication Data

US 2025/0117408 A1 Apr. 10, 2025

Related U.S. Application Data

(63) Continuation of application No. 18/484,018, filed on Oct. 10, 2023, now Pat. No. 12,326,880, which is a (Continued)

(51) Int. Cl.
*G06F 7/00* (2006.01)
*G06F 16/21* (2019.01)
(Continued)

(52) U.S. Cl.
CPC .......... *G06F 16/285* (2019.01); *G06F 16/211* (2019.01); *G06F 16/288* (2019.01);
(Continued)

(58) Field of Classification Search
CPC .... G06F 16/285; G06F 16/211; G06F 16/288; G06F 18/217; G06F 18/213; G06N 5/04
(Continued)

(56) References Cited

U.S. PATENT DOCUMENTS 7,308,646 B1 12/2007 Cohen et al.
7,788,213 B2 8/2010 Friedlander et al.
(Continued)

FOREIGN PATENT DOCUMENTS

IN 0463MUM2012 A 3/2014
WO 2014033747 A2 3/2014
WO 2016187501 A1 11/2016

OTHER PUBLICATIONS

European Search Report mailed Jul. 25, 2024, in connection with EP Patent Application No. 21882231 .0 (14 pages total).
(Continued)

*Primary Examiner* — Isaac M Woo
(74) *Attorney, Agent, or Firm* — Troutman Pepper Locke LLP

(57) ABSTRACT

An illustrative method includes retrieving one or more datasets and one or more metadata from a data source; mapping the retrieved one or more datasets and the one or more metadata to a target standard; inferring one or more variable classifications, one or more variable connections, and one or more groupings using the mapped one or more datasets and the mapped one or more metadata; performing a de-identification process with respect to the one or more datasets the inferred one or more variable classifications, the inferred one or more variable connections, and the inferred one or more groupings; performing a conversion of the one or more datasets to the target standard using the inferred one or more variable classifications, the inferred one or more variable connections, and the inferred one or more groupings; and generating an output comprising the converted one or more datasets.

20 Claims, 13 Drawing Sheets

Related U.S. Application Data continuation of application No. 17/505,863, filed on Oct. 20, 2021, now Pat. No. 11,782,956.

(60) Provisional application No. 63/104,724, filed on Oct. 23, 2020.

(51) Int. Cl.

| | |
|---|---|
| ***G06F 16/28*** | (2019.01) |
| ***G06F 18/21*** | (2023.01) |
| ***G06F 18/213*** | (2023.01) |
| ***G06N 5/04*** | (2023.01) |

(52) U.S. Cl.

CPC .......... *G06F 18/213* (2023.01); *G06F 18/217* (2023.01); *G06N 5/04* (2013.01)

(58) Field of Classification Search

USPC .................................................. 707/600–899

See application file for complete search history.

(56) References Cited

U.S. PATENT DOCUMENTS

| | | | |
|---|---|---|---|
| 7,877,421 | B2 | 1/2011 | Berger et al. |
| 8,326,849 | B2 | 12/2012 | El Emam et al. |
| 9,740,831 | B2 | 8/2017 | Burns et al. |
| 10,147,502 | B2 | 12/2018 | Paffel et al. |
| 10,642,854 | B2 | 5/2020 | Pattnaik et al. |
| 2004/0216030 | A1 | 10/2004 | Hellman et al. |
| 2010/0070500 | A1 | 3/2010 | Cui et al. |
| 2010/0299335 | A1 | 11/2010 | Gopalakrishnan et al. |
| 2013/0332194 | A1 | 12/2013 | D'Auria et al. |
| 2014/0350954 | A1 | 11/2014 | Ellis et al. |
| 2015/0134589 | A1 | 5/2015 | Marrelli et al. |
| 2016/0070758 | A1 | 3/2016 | Thomson et al. |
| 2017/0286456 | A1 | 10/2017 | Wenzel et al. |
| 2018/0082022 | A1 | 3/2018 | Francois |
| 2018/0314603 | A1* | 11/2018 | Gibbons, Jr. ....... H04L 67/1097 |
| 2019/0286620 | A1 | 9/2019 | Al-Haimi et al. |
| 2020/0311308 | A1 | 10/2020 | Arbuckle et al. |

OTHER PUBLICATIONS

International Search Report mailed Apr. 8, 2022, issued in connection with corresponding International Application No. [8] PCT/182021/000717 (5 pages total).

Qamar Nafees et al., "A Tool for Analyzing Clinical Datasets as Blackbox," In: Huhn, M., Williams, L. (eds) Software Engineering in Health Care, SEHC FHIES 2014, 2014. pp. 222-238, Lecture Notes in Computer Science, vol. 9062. Springer, Cham. https://doi.org/10.1007/978-3-319-63194-3_ 15, Jul. 27, 2017. (18 pages total).

Written Opinion in International Appln. No. PCT/IB2021/000717, mailed on Apr. 8, 2022, 5 pages.

* cited by examiner

310

```
{
  "name": "pa_analysis_time_of_first_exposure_to_study_treatment",
  "version": 3.0,
  "forProducts": [
    "Eclipse_Trials",
    "PA_Trials"
  ],
  "prettyName": "Analysis: Time of First Exposure to Study Treatment (TRTSTM)",
  "collection": "DM Subject-Level Date/Time Group",
  "dataTypes": [
    "long",
    "string",
    "double"
  ],
  "priority", 20,
  "defaultClassification": "ni",
  "notes": "",
  "risk": {
    "knowability": 1.0,
    "isPublic": true,
    "sharePriors": false,
    "demographicPullUpMethod": "NONE"
  }
}
```

```
{
  "condition": {
    "sqlQuery": "semantictype == 'pa_analysis_time_of_first_exposure_to_study_treatment"
  },
  "action": {
    "groups": [
      {
        "groupName": "Subject-Level Date/Time Group L2",
        "groupType": "other_qi",
        "columnReferences": []
      }
    ]
  },
  "description": ""
}
```

FIG. 3C

CONVERTING NON-STANDARD DATA INTO A TARGET STANDARD

CROSS-REFERENCE TO RELATED APPLICATIONS

This application is a continuation of U.S. patent application Ser. No. 18/484,018, filed Oct. 10, 2023, which is a continuation of U.S. patent application Ser. No. 17/505,863, filed Oct. 20, 2021, now U.S. Pat. No. 11,782,956, which claims priority to U.S. Provisional Patent Application No. 63/104,724, filed Oct. 23, 2020, each of which is incorporated herein by reference in its entirety.

FIELD OF INVENTION

Embodiments disclosed herein relate, in general, to a system and a method for data protection, and, more particularly, to a system and a method for de-identification of a dataset that is partially compliant or non-compliant to a given standard, herein collectively referred to as non-standard dataset.

BACKGROUND

Many jurisdictions now have data privacy laws and regulations to protect against disclosure of personal information, and organizations also wish to protect against the disclosure of confidential information. De-identification is a process by which personal information relating to a data subject and/or an individual is protected by various means (e.g., transformation, suppression, masking, synthesis, etc.). The de-identification can be rules-based, for example, the Health Insurance Portability and Accountability Act (HIPAA) Safe Harbor method, whereby select eighteen identifying variables are hidden or transformed. Moreover, Expert Determination and Safe Harbor are HIPAA methods. Moreover, an amount of de-identification required to meet a standard of statistical disclosure control is also influenced overall by the context in which data is being shared or released; public releases have a higher bar than data releases to a secure platform (e.g., a portal in which data access and retention are controlled and regulated) or sharing access in a controlled data environment. Disclosure control includes protecting identity, attribute, and inferential disclosure.

A statistical disclosure risk measurement requires a series of steps including appropriately modeling a dataset, introspecting a data to find various types of identifiable/sensitive information or variables, finding one or more connections between different variables, and assigning appropriate risk algorithm settings for each variable based on a previous research and expertise. After an initial disclosure risk of a dataset is determined, a de-identification is performed to bring the disclosure risk below the acceptable threshold. Any deviation in these steps may over- or under-estimate the disclosure risk leading to an over-de-identification (and thereby reduced data utility) or leaking of a personally identifiable information, respectively.

Datasets containing personal or confidential information come in all shapes and sizes. A dataset is any collection of data, including but not limited to structured data, unstructured data (including documents), or any combination or derivation thereof. In certain fields, data sharing needs or regulatory submission requirements have driven an establishment of data standards. In clinical trials sphere, for example, the two most commonly used standards are a Study Data Tabulation Model (SDTM), and an Analysis Data Model (ADaM). Many companies still possess or operate with non-standard datasets, as the non-standard datasets are historical datasets or due to existence of internal standards/policies that results in datasets deviating from or being extension of established standards. Studies have been conducted to assess a level of compliance to the established standards SDTM and ADaM. However, it has been observed that majority of datasets significantly deviated from the standards in their native format (as shown in FIG. 1A). Even where the datasets were considered highly compliant (>85%), there is a room for process improvement to ensure an accuracy of risk estimation, consistency of data transformations or synthesis, and a reduced effort, expertise, and training requirements. Moreover, FIG. 1(A) also illustrates datasets with medium compliance (60-85%), and datasets with low compliance (<60%).

De-identification of datasets, and specifically non-standard datasets, to share or release data for transparency, innovation, service improvement, and other secondary uses has high level of effort and expertise requirements to process (as shown in FIG. 1B). Currently, analysts must manually introspect data to correctly model the data, perform advanced Extract-Transform-Load (ETL) processes as necessary, find identifiable/sensitive information, and possess detailed know-how (expertise) regarding connections between the identifiable variables and appropriate settings for each variable, to accurately measure disclosure risk and de-identify the data. However, the latter steps are especially resource-intensive and can take up to 5-10 days for experienced analysts to complete and quality control, given the variability of incoming non-standard datasets and a sheer volume of variables (as in the case of clinical trial datasets) (as shown in the FIG. 1B). Moreover, some datasets can contain up to 100 tables and 10000+ variables with many interconnections and indirect relationships.

Conventionally, there are some processes or tools of data harmonization used, whereby not a mapping but a full conversion or transformation to a standard format is performed. An example of the data harmonization in practice is to convert or transform various clinical data sources into SDTM datasets, such as part of a data life cycle while collecting data from data spokes into a data hub.

Moreover, de-identification solutions currently allow generic characterization of datasets and elements of the datasets. An example is that available de-identification software solutions currently allow a user to associate variables in the data to very generic variable types, such as public quasi-identifier or direct identifier. The generic variable types can be combined with a feature that can load or apply settings for a dataset from either another project setup or from variable settings stored in, for example, an Excel format. This can be akin to a data catalog process whereby an exhaustive list of variables and variable settings are stored for future retrieval; if an incoming data variable matches particulars of a variable already existing in the catalog, it is handled appropriately.

However, previous solutions, systems and methods that have been developed to handle non-standard datasets have multiple drawbacks such that it may require specialized ETL processes to estimate disclosure risk and derive a de-identification strategy, requires detailed assessments of a potential correlation between variables, and heavy manual effort to align dependencies between correlated or indirectly connected variables and to perform the overall de-identification process on datasets. The estimation of disclosure risk to derive a de-identification strategy may cause over-estimation of risk and over-de-identification, or under-estimation of risk and potentially leaking sensitive information. Moreover, this workflow, as shown in the FIG. 1B, also requires specialized ETL processes to ingest data for disclosure risk estimation, and post-processing to ensure the derived de-identification strategy (including de-identification transformations or replacement through data synthesis) is fully applied to the entire non-standard dataset. Such processes are known to be difficult to productize in their entirety, and do not negate the need for expertise in certain areas such as variable connections and configuring risk/de-identification settings. There are many decision points in key areas of the process, resulting in higher requirements for quality control checks and multiple analysts working on the same dataset. Unless data harmonization to standard formats is part of a normal data life cycle for clients, it is unrealistic to expect them to perform transformation or conversion of their non-standard datasets to standard format just for the purposes of applying data privacy, and then converting back.

Moreover, the current solutions do not provide enough granularity in variable types and other forms of data characterizations to accurately capture the disclosure risk and de-identification complexities of all types of data, such as clinical trials data. This necessitates the use of data catalogs, to track every instance of a variable and data characteristic seen previously and the associated settings for it. However, there is always the possibility that a given dataset may contain new variables or other data characteristics that are not captured by generic variable types or the data catalog, and requires an expansion of the data catalog. This limits scalability across multiple dimensions, including effort, time, and utility.

Thus, there is a need for a system, a device, and a process to automate the conversion, or to map the data to the standard.

SUMMARY

Embodiments of the present invention provide an intermediary mapping and de-identification system for de-identification of one or more non-standard datasets to share or release data for transparency, innovation, service improvement, and other secondary uses. The intermediary mapping and de-identification system is configured to perform an intermediary mapping of the non-standard datasets to a known set of schema and variables (or standard) for which complex requirements can be pre-defined in an automated fashion.

Embodiments in accordance with the present invention may provide a number of advantages depending on its particular configuration. First, embodiments of the present invention may provide a system and a method to perform an intermediary mapping to a standard schema model and variables, which allows a simple and an automated interpretation of a variable connection and disclosure risk metric settings handling, and de-identification. Further, embodiments of the present invention may provide a system and a method to streamline a quality control and an auditing of an entire de-identification workflow by reducing inter-analyst variability in an expertise application.

Further, embodiments of the present invention may provide a system and a method to use a wrapper of intermediary mapping to apply data privacy to non-standard datasets (i.e., the non-standard dataset that is processed, maintains its format upon completion). Further, embodiments of the present invention may provide a system and a method which reduce an effort as currently, the de-identification process consists of many steps including data modeling, variable classification, variable risk settings, variable connection, and variable de-identification settings. Embodiments of the present invention may provide a system and a method to restrict an effort to the modeling and classification steps, whereby users map the schema and variables to a given standard. The remaining steps can be inferred from the mapping as per this process.

Further, embodiments of the present invention may provide a system and a method for reducing a requirement of expertise and training as determining variable connections and settings is a highly technical aspect of a risk-based de-identification process, almost always requiring an experienced disclosure risk analyst doing these steps. Embodiments of the present invention may provide a system and a method that eliminates this expertise barrier by having the details encoded/preset for a given standard, restricting the expertise and training to be centered around how non-standard datasets map to a given standard only.

Further, embodiments of the present invention may provide a flexible system as previous solutions have been centered around a specific domain for mapping or downstream uses, for example, clinical trials. Embodiments of the present invention may provide a system that allows adaptability of the system for any type of data, such as transactional data.

Further, embodiments of the present invention may provide a scalable system as generic variable types and data catalog processes are not scalable when it comes to disclosure risk and control, as tweaks are almost always required based on incoming non-standard datasets. By mapping to a standard, downstream actions of the disclosure risk and control can be inferred. Thus, an overall solution becomes more scalable, since a large part of the de-identification process becomes static.

Embodiments of the present invention may provide one or more new variable types for mapping and new determinations on advanced disclosure control settings required for each variable type. One advanced example of a shift in methods would be that instances of Medical History Start Date would presently be categorized generally as Date fields, which do not share prior estimates (i.e., frequency distributions) for a disclosure risk measurement. In an embodiment of the present invention, the above stated is mapped to a more granular medical_history_start_date variable type that does share prior estimates (e.g., the frequency distributions), thus providing more granularity and accuracy for disclosure risk assessment, and subsequent improved de-identification.

Presently, correlations between fields are used to inform how to apply a de-identification strategy for the de-identification of the full dataset. The application of a de-identification may be performed manually or using custom scripting. In an embodiment of the present invention, correlations are akin to groupings of variables, which serve a dual purpose; in a more accurate disclosure-risk calculation, groupings may manifest as measurement groups, and in a more refined, automated de-identification process, groupings may serve the role of propagation de-id groups. Further, certain variable groupings are redesigned that existed before, as well new groupings are created. Furthermore, the disclosure control is performed over the entire dataset in a single pass, versus present approaches that may require specialized ETL processes to determine a de-identification strategy before applying this for the de-identification of the full dataset.

These and other advantages will be apparent from the present application of the embodiments described herein.

The preceding is a simplified summary to provide an understanding of some embodiments of the present invention. This summary is neither an extensive nor an exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein:

FIG. 3A illustrates an exemplary variable type container, according to an embodiment of the present invention;

FIG. 3C illustrates an exemplary simple rule within a ruleset that infers a group of a dataset field based on a variable mapping, according to an embodiment of the present invention;

DETAILED DESCRIPTION

Figure 1A:
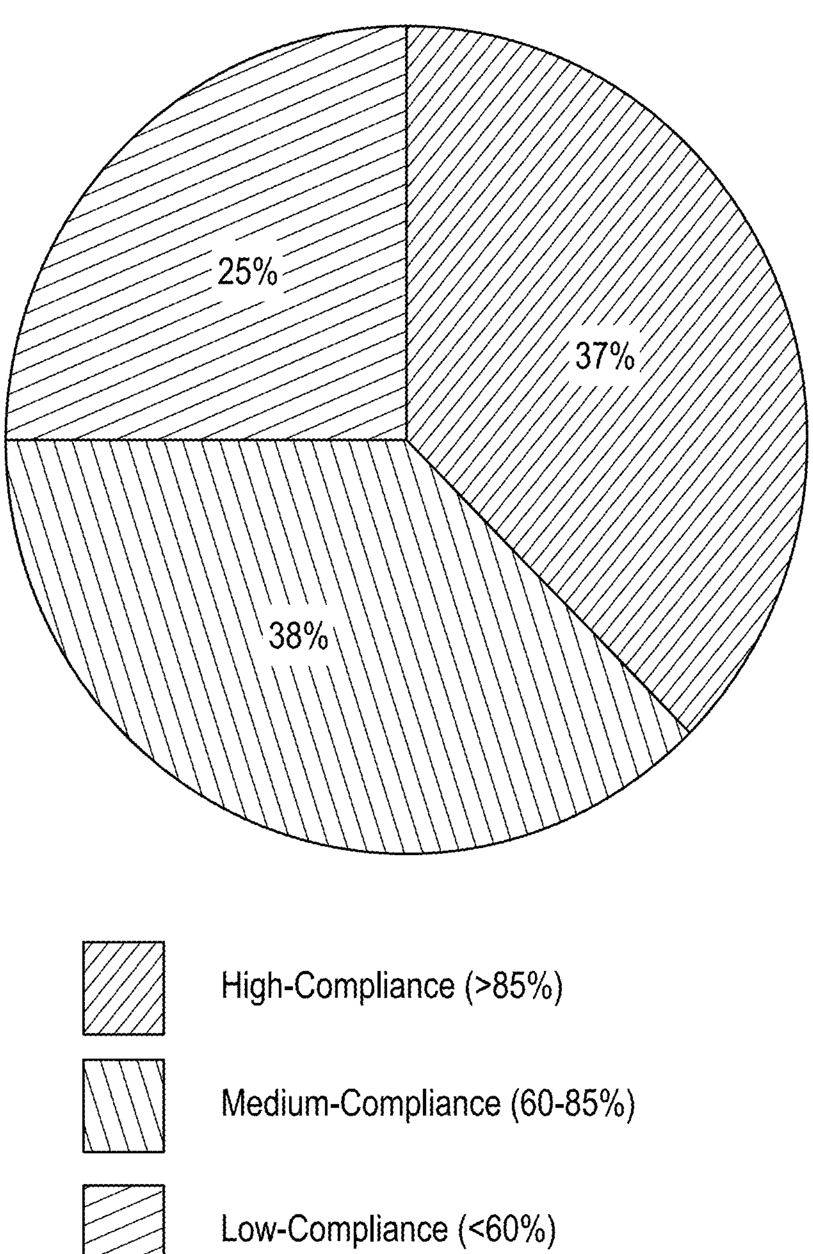
FIGS. 1A-1C illustrate prior art.
Figure 1B:
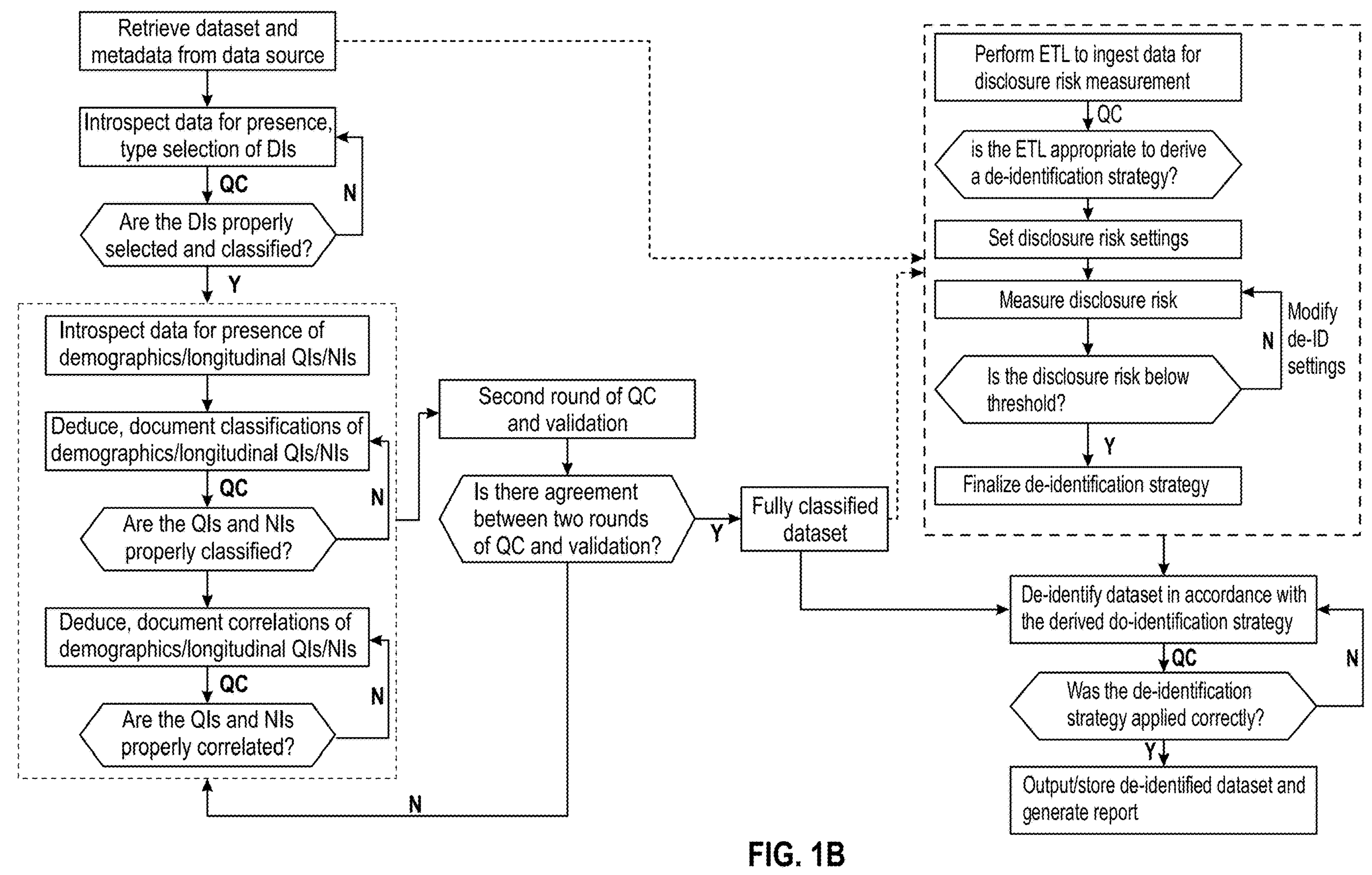

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "dataset" is used broadly to refer to any data or collection of data, inclusive of but not limited to structured data (including tabular data or data encoded in JSON or other formats and so on), unstructured data (including documents, reports, summaries and so on), partial or subset data, incremental data, pooled data, simulated data, synthetic data, or any combination or derivation thereof. Certain examples are depicted or described herein in exemplary sense without limiting the present disclosure to other forms of data or collection of data.

Figure 1C:
Figure 1C:
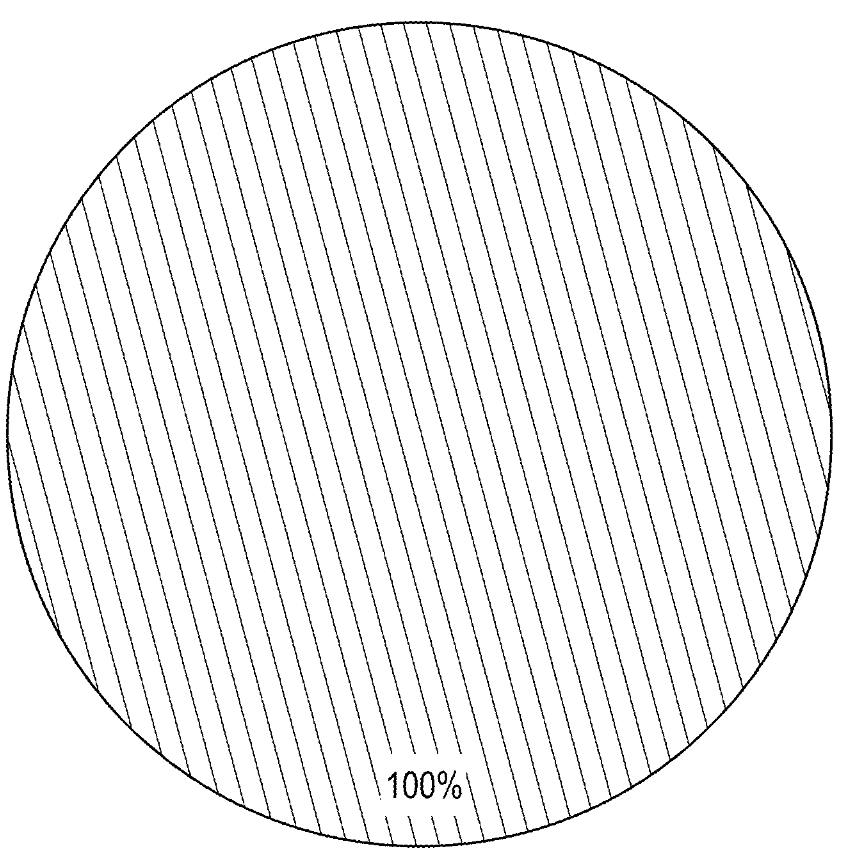

There has been a consistent drive to design a solution for professional services and external clients that is simplified, streamlined and highly productize-able. A key indicator of a success included designing a solution that may reduce an effort and an expertise requirement, while maintaining applicability across most datasets that a product sees. Further, studies have shown that it is easier to automate a disclosure risk metric calculation and a de-identification of datasets compliant with existing standards like the SDTM and the ADaM. Further, a partially compliant or one or more non-compliant clinical trials datasets may be viably mapped to standards in terms of one or more schema and one or more variable equivalents. Furthermore, in a subset of studies (n=13) of varying compliance levels, the schema and the variables of all studies may be easily mapped to the existing standards like, the SDTM and/or ADaM, in addition to approximately 5 to 10 extension variables (commonly seen in clinical trials datasets) with just a little effort and introspection (as shown in FIG. 1C). The remaining 1-3% of fields required slightly detailed introspection and was deemed that a full coverage can be satisfied if the standard is extended by a few additional custom variables unique to certain datasets.

Figure 1D:
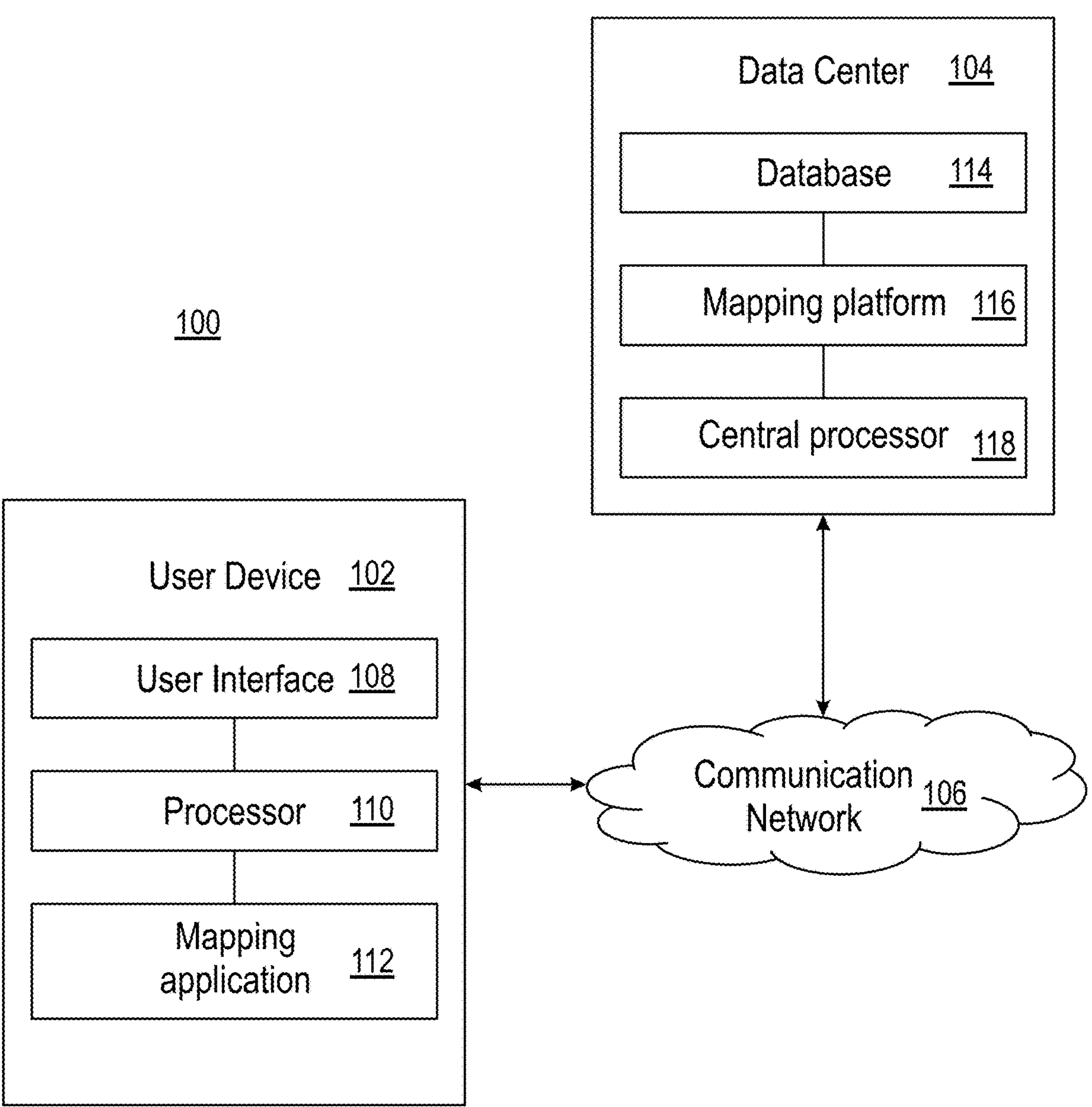
FIG. 1D illustrates an intermediary mapping and de-identification system, according to an embodiment of the present invention.

FIG. 1D illustrates an intermediary mapping and de-identification system 100, according to an embodiment of the present invention. The intermediary mapping and de-identification system 100 may be configured for de-identification of one or more datasets using an intermediary mapping technique, according to embodiments of the present invention. According to embodiments of the present invention, the datasets may be, but not limited to, one or more non-standard datasets, one or more standard datasets, one or more synthetic datasets, partial or subset datasets, and so forth. Embodiments of the present invention are intended to include or otherwise cover any type of the datasets that may require de-identification. The intermediary mapping and de-identification system 100 may comprise a user device 102, and a data center 104. Further, the user device 102, and the data center 104 may be connected through a communication network 106, according to an embodiment of the present invention.

According to an embodiment of the present invention, the communication network 106 may be a Wireless Local Area Network (WLAN) of a premises, such as, but not limited to, a house, an office, etc. of a user. According to embodiments of the present invention, the communication network 106 may include a data network such as, but not limited to, an Internet, a Local Area Network (LAN), a Wide Area Network (WAN), a Metropolitan Area Network (MAN), and so forth. In some embodiments of the present invention, the communication network 106 may include a wireless network, such as, but not limited to, a cellular network and may employ various technologies including an Enhanced Data Rates for Global Evolution (EDGE), a General Packet Radio Service (GPRS), and so forth. According to an embodiment of the present invention, the user device 102 and the data center 104 may be configured to communicate with each other by one or more communication mediums connected to the communication network 106. The communication mediums include, but are not limited to, a coaxial cable, a copper wire, a fiber optic, a wire that comprise a system bus coupled to a processor of a computing device, and so forth. Embodiments of the present invention are intended to include or otherwise cover any type of the communication mediums, including known, related art, and/or later developed technologies.

According to an embodiment of the present invention, the user device 102 may be an electronic device that may enable the user to receive and/or transmit data associated with the intermediary mapping and de-identification system 100. According to embodiments of the present invention, the user device 102 may be, but not limited to, a mobile device, a smart phone, a tablet computer, a portable computer, a laptop computer, a desktop computer, a smart device, a smart watch, a smart glass, a Personal Digital Assistant (PDA), and so forth. Embodiments of the present invention are intended to include or otherwise cover any type of the user device 102, including known, related art, and/or later developed technologies.

Further, the user device 102 may comprise a user interface 108 and a processor 110. The user interface 108 may be configured to enable the user to input data into the intermediary mapping and de-identification system 100, according to an embodiment of the present invention. The data may be the datasets associated with fields such as, but not limited to, a research study, an insurance field, a social media, and so forth. In a preferred embodiment of the present invention, the datasets may be associated with a clinical trial. Embodiments of the present invention are intended to include or otherwise cover any type of input data or subset of data. The user interface 108 may be further configured to display an output data associated with the intermediary mapping and de-identification system 100, according to an embodiment of the present invention. Further, the user interface 108 may be, but is not limited to, a digital display, a touch screen display, a graphical user interface, and so forth. Embodiments of the present invention are intended to include or otherwise cover any type of the user interface 108 including known, related art, and/or later developed technologies.

The processor 110 may be configured to process data associated with the intermediary mapping and de-identification system 100, according to embodiments of the present invention. Further, the processor 110 may be, but not limited to, a Programmable Logic Control unit (PLC), a microcontroller, a microprocessor, a computing device, a development board, and so forth. Embodiments of the present invention are intended to include or otherwise cover any type of the processor 110 including known, related art, and/or later developed technologies that may be capable of processing the received data.

Further, the user device 102 may comprise one or more computer readable applications such as, but not limited to, a social media application, a browser, a banking application, a music application, and so forth. In a preferred embodiment of the present invention, the computer readable application may be a mapping application 112. The mapping application 112 may be configured to enable the user to perform operations associated with the intermediary mapping and de-identification system 100, according to embodiments of the present invention.

The data center 104 may be a centralized location used to house computer systems and associated components for processing data associated with the intermediary mapping and de-identification system 100. The data center 104 may comprise one or more non-transitory computer-readable storage, a mapping platform 116, and a central processor 118, according to an embodiment of the present invention. The one or more non-transitory computer-readable storage may be a database 114. According to embodiments of the present invention, the database 114 may be configured for storage and retrieval of data associated with the intermediary mapping and de-identification system 100. The database 114 may be, but is not limited to, a centralized database, a distributed database, a personal database, an end-user database, a commercial database, a Structured Query Language (SQL) database, a Non-SQL database, an operational database, a relational database, a cloud database, an object-oriented database, a graph database, and so forth. Embodiments of the present invention are intended to include or otherwise cover any type of the database 114 including known, related art, and/or later developed technologies that may be capable of data storage and retrieval.

The mapping platform 116 may be one or more computer readable instructions that may be stored onto the database 114 and configured to control operations of the mapping application 112 installed on the user device 102 when executed by the central processor 118. Further, the working of the mapping platform 116 will be explained in detail in conjunction with FIG. 2. The central processor 118 may be, but not limited to, a Programmable Logic Control unit (PLC), a microcontroller, a microprocessor, a computing device, a development board, and so forth. Embodiments of the present invention are intended to include or otherwise cover any type of the central processor 118 including known, related art, and/or later developed technologies.

Figure 2:
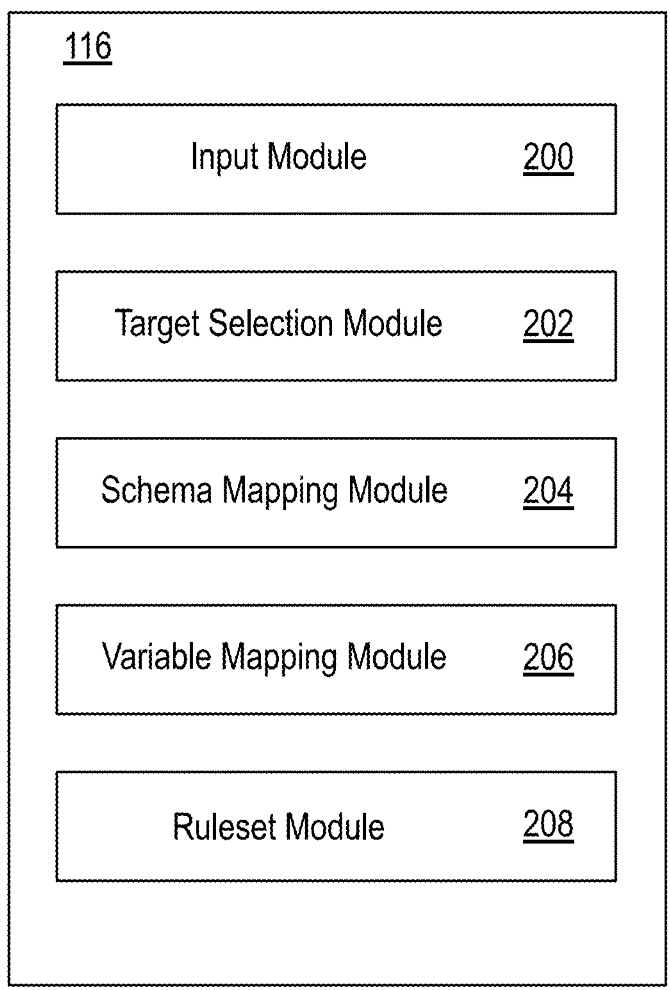
FIG. 2 illustrates components of a mapping platform of the intermediary mapping and de-identification system, according to an embodiment of the present invention.

FIG. 2 illustrates components of the mapping platform 116 of the intermediary mapping and de-identification system 100, according to embodiments of the present invention. The mapping platform 116 may comprise an input module 200, a target selection module 202, a schema mapping module 204, a variable mapping module 206, and a ruleset module 208.

The input module 200 may be configured to enable a user to input data source into the intermediary mapping and de-identification system 100 through an input data menu (not shown) of the mapping application 112 installed on the user device 102, according to an embodiment of the present invention. In another embodiment of the present invention, the input module 200 may be configured to fetch the data source stored at the database 114 of the data center 104. In yet another embodiment of the present invention, the input module 200 may be configured to automatically retrieve the dataset and a metadata from a data source accessible through the communication network 106. In yet another embodiment of the present invention, the input module 200 may be configured to restrict the data source to certain tables, variables, subsets, or on other forms of restrictions, as input data source into the intermediary mapping and de-identification system 100. In yet another embodiment of the present invention, the input module may be configured to retrieve extracted from unstructured text data. In a preferred embodiment of the present invention, the data source may be associated with a clinical trial. Further, the metadata may be a data that may describe a basic information about the dataset such as, but not limited to, a datatype, a date, a title, a creator associated with the dataset, a codebook, a readme file of the dataset, a supporting document or file of the dataset (e.g. for a clinical trial this can be a clinical study report and/or a case report form), and so forth. Embodiments of the present invention are intended to include or otherwise cover any type of the metadata including known, related art, and/or later developed technologies. Further, the input module 200 may be configured to transmit the retrieved dataset and the retrieved metadata to the target selection module 202, the schema mapping module 204, and the variable mapping module 206, according to an embodiment of the present invention.

The target selection module 202 may be configured to select a target standard that may be utilized for the mapping of the retrieved dataset from the data source, according to embodiments of the present invention. The standard may be, but not limited to, a standard that already exists in a particular field such as, a Study Data Tabulation Model (SDTM), an Analysis Data Model (ADaM) standard available for the clinical trials, a custom standard, an ontology defined by an analyst for reuse for sets of a similar dataset, a subset of a standard, an extension of a standard, a combination of multiple standards and so forth. Embodiments of the present invention are intended to include or otherwise cover any type of the standards pertaining to any type of the field. Further, the standard may be considered as a good standard, if most or all disclosure control settings (including, but not limited to, correlations, risk settings de-identification settings, etc.) at a table and a variable level can be preset or pre-determined with reasonably high confidence (in a reproducible manner). In an embodiment of the present invention, the target selection module 202 may be configured to transmit the selected target standard to the schema mapping module 204.

The schema mapping module 204 may be configured to map one or more tables from the incoming dataset to one or more specific domains (hereinafter referred to as the domain-specific mapping) or one or more table types in the selected target standard, according to an embodiment of the present invention. Further, the schema mapping module 204 may be configured to perform the schema mapping by using the one or more table and/or one or more domain type list such that the one or more table and/or one or more domain type list comprises, but not limited to, a customized list of table, one or more domain types based on the standard, an extension table, one or more domain types, and so forth. Further, the schema mapping module 206 may be configured to process a modeling of the dataset by determining a connection between one or more specific tables to other tables that may be inferred from the domain-specific mapping. In an exemplary scenario, if a table "ABC" in an incoming dataset is mapped to "Demographics" domain in the SDTM standard, then the schema mapping module 204 may be configured to infer that table "ABC" as a parent table (or a Level 1/L1 table) to which all other tables may connect.

Further, the schema mapping module 204 may be configured to retrieve a schema mapping of the incoming dataset using a table name, a metadata, an introspection, or other sources and/or means, in an embodiment of the present invention. Furthermore, the schema mapping module 204 may be configured to interpret the schema mapping of the incoming dataset using the table name, the metadata, the introspection, or other sources and/or means, in an embodiment of the present invention. The schema mapping module 204 may further be configured to store the schema mapping of the incoming dataset using the table name, the metadata, the introspection, or other sources and/or means. In yet another embodiment of the present invention, the schema mapping module 204 may be configured to set the schema mapping of the incoming dataset using the table name, the metadata, the introspection, or other sources and/or means, in an embodiment of the present invention. In yet another embodiment of the present invention, the schema mapping module 204 may be configured to construct a transient schema for data extracted from unstructured text, employing attributes of the extracted text, including, but not limited to, the text of a particular word, the text of adjacent words, metadata of a particular word (such as its position on the page), and metadata of adjacent words. In an embodiment of the present invention, the schema mapping module 204 may be configured to use a rules-based approach to perform the schema mapping based on a retrieved non-standard dataset and/or a synthetic dataset. In another embodiment of the present invention, the schema mapping module 204 may be configured to use an Artificial Intelligence (AI) algorithm to perform the schema mapping based on the retrieved non-standard dataset and/or the synthetic dataset. The AI algorithm may be, but not limited to, a naive Bayes, a decision tree, a random forest, a support vector machine, a linear regression, a lasso regression, a logistic regression, and so forth. Embodiments of the present invention are intended to include or otherwise cover any type of the AI algorithm including known, related art, and/or later developed technologies. According to another embodiment of the present invention, the schema mapping module 204 may be configured to enable the user to manually execute the schema mapping. The schema mapping may not be required in part or as a whole in some cases and may be skipped when the modeling of the incoming dataset is compatible with one or more associated disclosure control methods. In such case and others, the dataset is still considered fully mapped for the purposes of the present disclosure and embodiments depicted and described herein.

Further, the schema mapping module 204 may be configured to enable the schema mapping to influence and/or inform one or more downstream variable mappings, one or more classifications, one or more groupings, and one or more disclosure control settings. In an exemplary scenario, if a table "DEF" maps to a "Comments" domain in the SDTM standard, then the schema mapping module 204 may be configured to infer and/or determine that all variables in the table "DEF" needs to be masked to a NULL or the table "DEF" removed from a de-identification output, irrespective of a variable mapping. According to an embodiment of the present invention, the schema mapping module 204 may be further configured to enable the retrieved schema mapping to influence and/or inform an advanced modeling. In an embodiment of the present invention, if the schema mapping module 204 determines that a table "GHI" and a table "JKL" both map to an "Adverse Events" domain in the SDTM standard, then the schema mapping module 204 may be configured to determine that a table group may be required (a form of advanced modeling where claims or transactions from all tables in the table group are jointly considered for a disclosure risk measurement) for the table "GHI" and the table "JKL". In another embodiment of the present invention, if the schema mapping module 204 determines that the table "GHI" and the table "JKL" both map to the "Adverse Events" domain in the SDTM standard, then the schema mapping module 204 may be configured to determine that the table "GHI" and the table "JKL" needs to be linked in another way. Further, the schema mapping will be discussed in detail in conjunction with FIG. 5.

The variable mapping module 206 may be configured to determine whether one or more variables in the incoming dataset can be mapped to one or more defined variables in the target standard, according to an embodiment of the present invention. Further, the variable mapping module 206 may be configured to retrieve a variable mapping of the incoming dataset using a table name, a variable name, a metadata, an introspection, or other sources and/or means, in an embodiment of the present invention. In another embodiment of the present invention, the variable mapping module 206 may be configured to interpret the variable mapping of the incoming dataset using the table name, a variable name, the metadata, the introspection, or other sources and/or means, in an embodiment of the present invention. In yet another embodiment of the present invention, the variable mapping module 206 may be configured to store the variable mapping of the incoming dataset using the table name, a variable name, the metadata, the introspection, or other sources and/or means, in an embodiment of the present invention. In yet another embodiment of the present invention, the variable mapping module 206 may be configured to set the variable mapping of the incoming dataset using the table name, a variable name, the metadata, the introspection, or other sources and/or means, in an embodiment of the present invention. Further, the variable mapping module 206 may be configured to use a rules-based approach to perform the variable mapping based on the retrieved non-standard dataset and/or the synthetic dataset. In another embodiment of the present invention, the variable mapping module 206 may be configured to use an Artificial Intelligence (AI) algorithm to perform the variable mapping based on the retrieved non-standard dataset and/or the synthetic dataset. The AI algorithm may be, but not limited to, a naive Bayes, a decision tree, a random forest, a support vector machine, a linear regression, a lasso regression, a logistic regression, and so forth. Embodiments of the present invention are intended to include or otherwise cover any type of the AI algorithm including known, related art, and/or later developed technologies. The variable mapping of one or more variables may not be required in some cases and may be skipped if such a strategy is compatible with one or more associated disclosure control methods. In such case and others, the dataset is still considered fully mapped for the purposes of the present disclosure and embodiments depicted and described herein.

According to another embodiment of the present invention, the variable mapping module 206 may be configured to enable the user to manually execute the variable mapping of the incoming dataset. Further, the variable mapping module 206 may be configured to enable the variable mapping to influence and/or inform one or more downstream variable groupings and one or more disclosure control settings. Furthermore, the variable mapping module 206 may be configured to enable the variable mapping to influence and/or inform one or more settings and one or more mappings of other variables.

According to embodiment of the present invention, the variable mapping module 206 may be configured to perform the variable mapping by using one or more variable type list such that the one or more variable type list comprises one of, a customized list of variables based on the standard, one or more extension variable types informed by the standard, one or more extension variable types informed by a disclosure control expert, and so forth. Further, the variable mapping module 206 may be configured to provide a plurality of a customized list of variable types for the variable mapping (personal identifier types), according to embodiments of the present invention. The customized list of variable types may be based on the SDTM and ADaM standards that may be provided along with 5-10 extension variable types that may be already available in clinical trials.

Figure 3B:
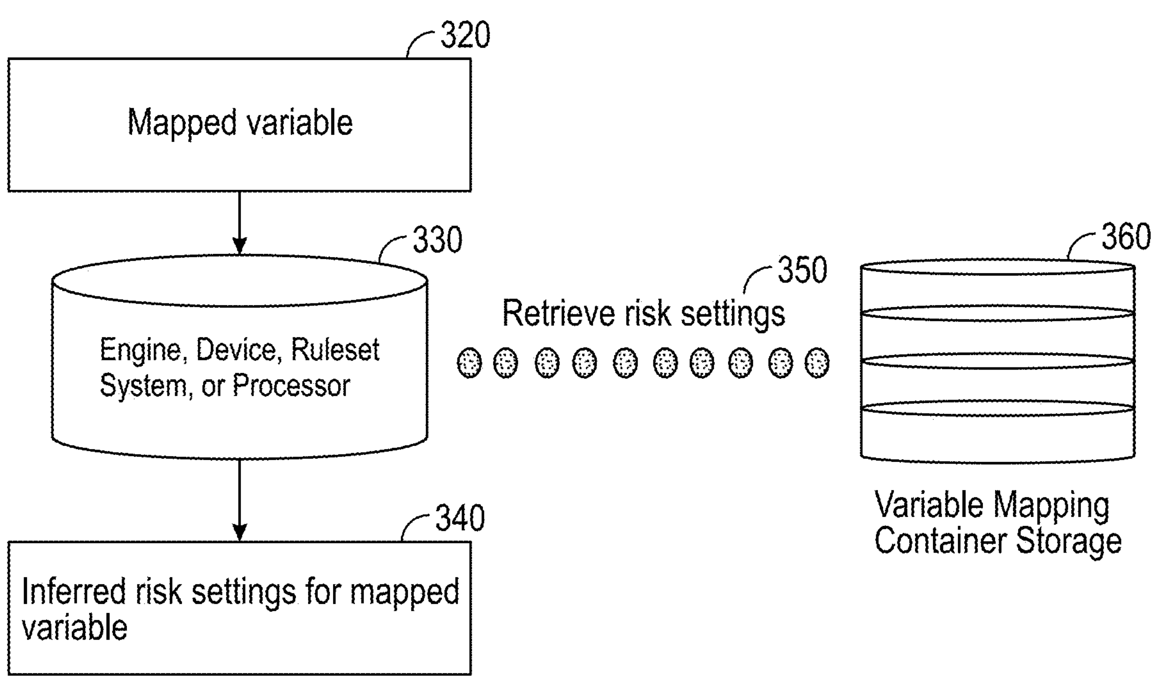
FIG. 3B illustrates a flowchart of the exemplary variable type container, according to an embodiment of the present invention.

The customized list of the variable types may enable the variable mapping module 206 that may be configured to further enable the user to perform the variable mapping instead of a classification or categorization purpose in the case for generic variable types. In an exemplary embodiment of the present invention, if the variable mapping module 206 determines that a column "XYZ" is labeled as "Medical History Start Date" from the SDTM standard using the customized list of variable types, then the variable mapping module 206 may be configured to interpret the action as the variable mapping. Further, the variable mapping module 206 may be configured to code one or more disclosure risk settings into the customized list of variable types directly for a downstream retrieval. In an embodiment of the present invention, the customized list of variable types along with 5-10 extension variable types that may be already available in clinical trials may be stored in a JavaScript Object Notation (JSON) format along with associated meta-data. Further, the variable mapping module 206 may be configured to use same shell and/or storage method that may be defined as a variable type container (as shown in FIG. 3A and FIG. 3B) that may be similar to the one used for one or more classic generic variable types. Further, the variable type container may be configured to infer a group of a dataset field based on the generated variable mapping. The data field may be, but not limited to, one or more variable classifications, one or more variable connections, one or more groupings, one or more disclosure risk settings, one or more de-identification settings, and so forth. In an embodiment of the present invention, a purpose of the element may be changed to facilitate the variable mapping. Further, the variable mapping will be discussed in detail in conjunction with FIG. 5.

Figure 3D:
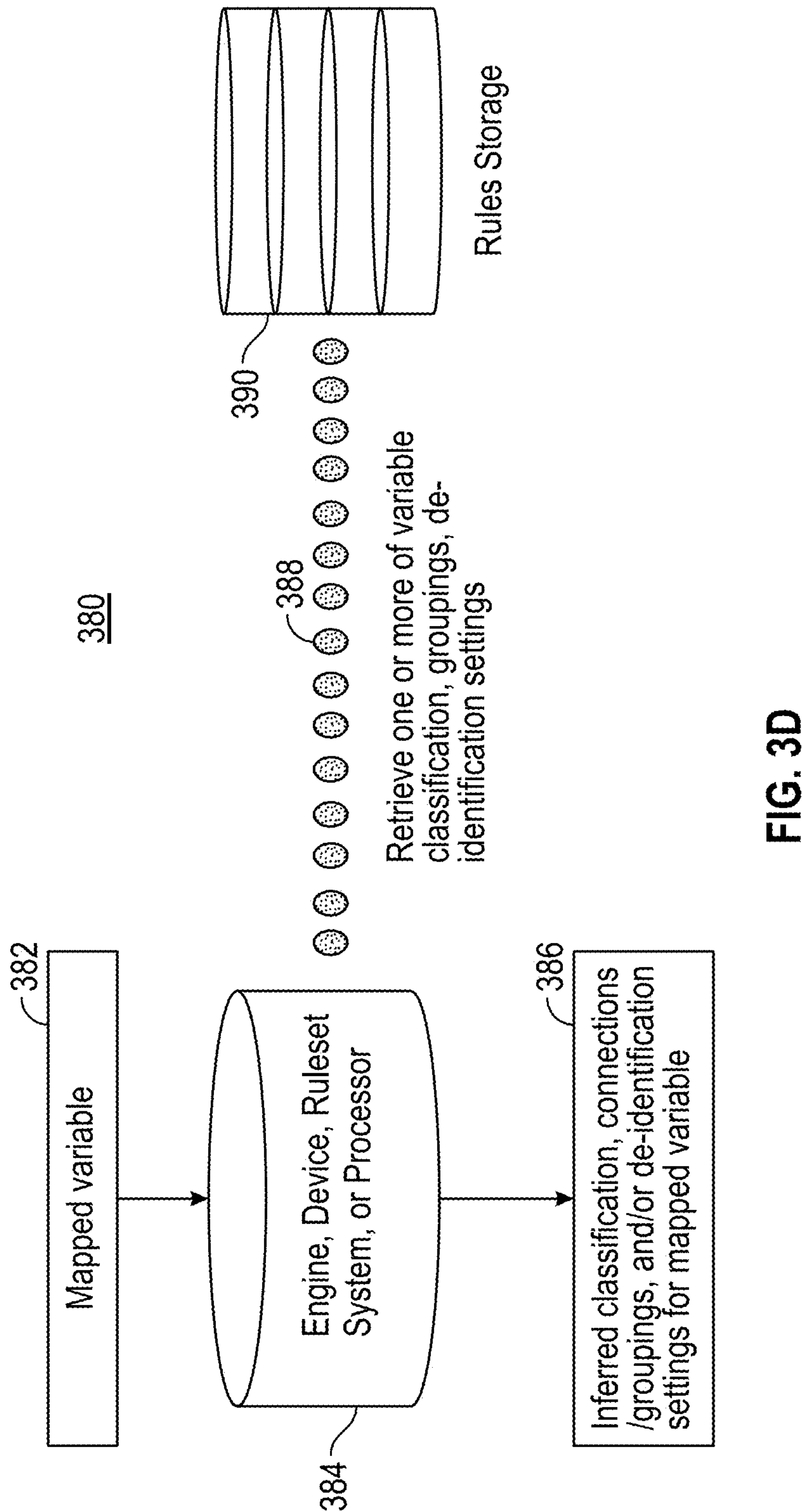
FIG. 3D illustrates a flowchart of an exemplary ruleset and a ruleset engine performing inference based on a variable mapping, according to an embodiment of the present invention.

According to an embodiment of the present invention, the ruleset module 208 may be configured to serve a dual function. The ruleset module 208 may be configured to access the generated variable mapping and further infer the variable mapping with, but not limited to, an appropriate variable classification (such as, a type of identifier), one or more groupings, one or more disclosure risk settings, and one or more de-identification settings, and so forth using a ruleset engine 384 (as shown in FIG. 3D). Further, the ruleset module 208 may be configured to retrieve the one or more variable classification, the one or more groupings, the one or more disclosure risk settings, one or more de-identification settings, and so forth from a rules storage 386 (as shown in the FIG. 3D). In an alternate embodiment of the present invention, the ruleset module 208 may be configured to access the generated schema mapping and further infer the schema mapping with, but not limited to, an appropriate classification, one or more groupings, one or more disclosure risk settings, and one or more de-identification settings, and so forth. In an embodiment of the present invention, the ruleset module 208 may be configured to automate and/or facilitate the mapping of the one or more datasets and the one or more metadata. In an embodiment of the present invention, the ruleset module 208 may be configured to utilize the JSON file format that captures a plurality of decisions and/or inferences and a rules engine that may be capable of interpreting and applying one or more rules. In an embodiment of the present invention, the ruleset module 208 may be configured to define a simple rule within a ruleset, that may infer the group of the dataset field based on the generated variable mapping shown in the variable type container 370 (as shown in FIG. 3C). The data field may be, but not limited to, the one or more variable classifications, the one or more variable connections, the one or more groupings, the one or more disclosure risk settings, the one or more de-identification settings, and so forth. According to embodiments of the present invention, the ruleset module 208 may be further configured to help in an automation of the variable mapping and/or the schema mapping. Further, the inference of the variable mapping and/or the schema mapping and the automation of the variable mapping and/or the schema mapping need not be a same entity or driven by a same engine and/or device, according to embodiments of the present invention. According to embodiments of the present invention, the dual function of the ruleset module 208 and the customized list of variable types that may be provided along with 5-10 extension variable types may be capable of functioning in conjunction with each other to enable an operation of the intermediary mapping and de-identification system 100. Further, the ruleset module 208 may be configured to generate an output that may be the fully mapped non-standard dataset to the target standards, according to an embodiment of the present invention.

FIG. 3A illustrates an exemplary variable type container, according to an embodiment of the present invention. FIG. 3A illustrates a variable type container 300. Code is illustrated for the variable type container 300.

FIG. 3B illustrates another variable type container 310. In addition, a mapped variable 320 is shown along with an engine, device, ruleset, system, or processor 330. Further, risk settings for mapped variables are inferred 340. Risk settings are retrieved 350. A variable mapping container storage 360 is shown.

FIG. 3C illustrates an exemplary simple rule within a ruleset that infers a group of a dataset field based on the variable mapping, according to an embodiment of the present invention. FIG. 3C illustrates another variable container 370. As in FIG. 3A, code illustrates the variable container 370.

FIG. 3D illustrates a flowchart 380 of an exemplary ruleset and the ruleset engine performing inference based on the variable mapping, according to an embodiment of the present invention. A mapped variable 382 is also illustrated. The ruleset engine 384 may access the generated variable mapping and further infer the variable mapping with, but not limited to, the appropriate variable classification (such as, a type of identifier), the one or more groupings, the one or more disclosure risk settings, and the one or more de-identification settings, and so forth. Classifications, connections/groupings, and/or de-identification settings for mapped variables can be inferred 386. Further, the ruleset engine 384 may be configured to retrieve 388 the one or more variable classification, the one or more groupings, the one or more disclosure risk settings, the one or more de-identification settings, and so forth from a rules storage 390.

Figure 4:
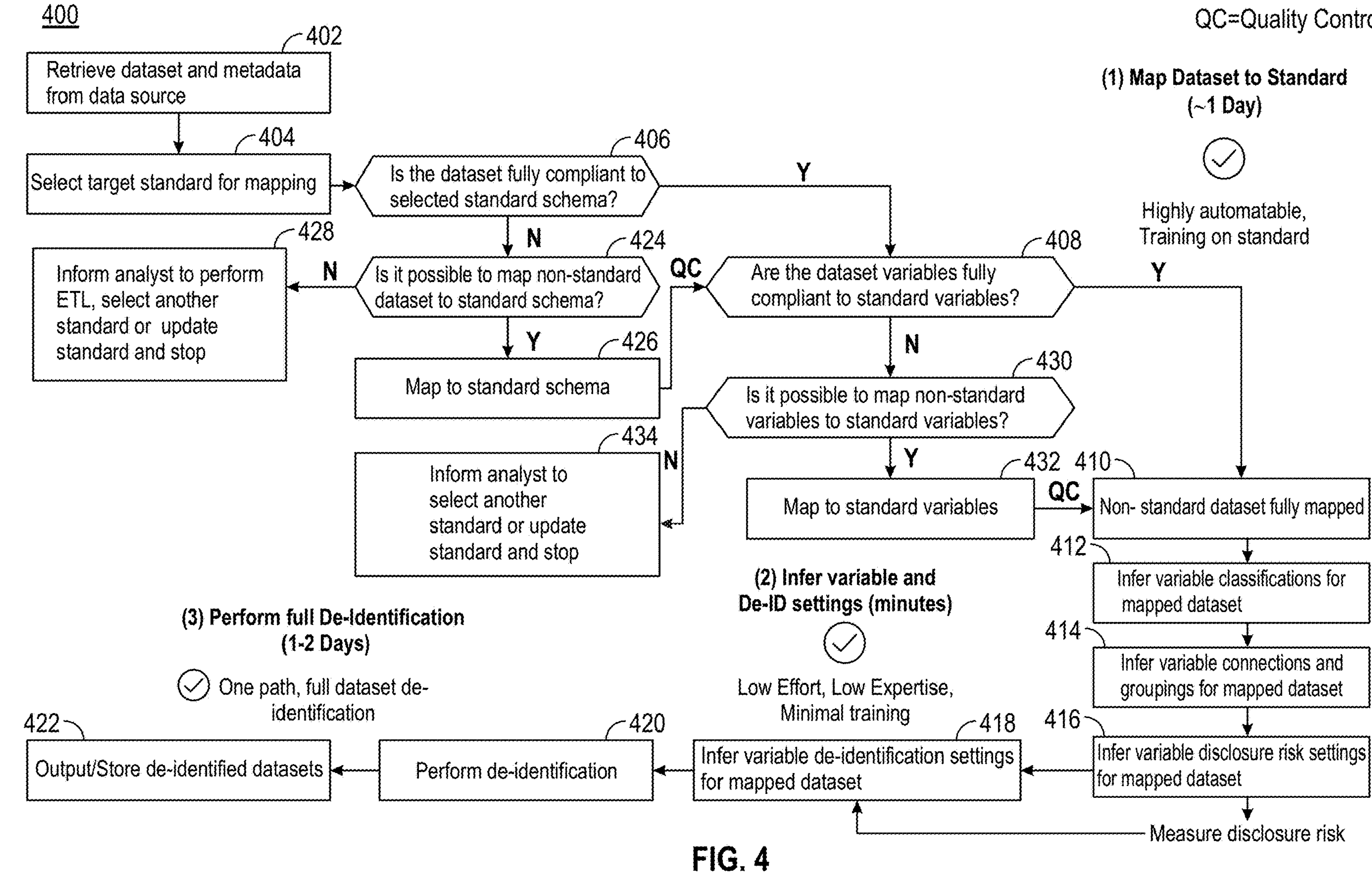
FIG. 4 illustrates a flowchart of an overall process for the intermediary mapping and de-identification system, according to an embodiment of the present invention.

FIG. 4 illustrates a flowchart of an overall process 400 for the intermediary mapping and de-identification system, according to embodiments of the present invention. The intermediary mapping and de-identification system may be configured to viably map one or more non-standard datasets to an existing or a new standard, in terms of a schema and/or one or more variables, that may allow a downstream automation or a streamlining of one or more control steps.

At step 402, the intermediary mapping and de-identification system may retrieve a dataset and a metadata from a data source that may be accessed through the communication network 106.

At step 404, the intermediary mapping and de-identification system may select a target standard for mapping the retrieved dataset. The standard may be, but not limited to, a standard that already exists in a particular field such as a Study Data Tabulation Model (SDTM), an Analysis Data Model (ADaM) standard available for the clinical trials, a custom standard, an ontology defined by an analyst for reuse for sets of a similar dataset, a subset of a standard, an extension of a standard, a combination of multiple standards and so forth.

At step 406, if the intermediary mapping and de-identification system determines that the retrieved dataset is fully compliant to the selected target standard, then the process 400 may proceed 400 to a step 408, otherwise the process 400 may proceed to a step 424.

At the step 408, if the intermediary mapping and de-identification system determines that the retrieved dataset is fully compliant to the standard variables of the target standard, then the process 400 may proceed to a step 410, otherwise the process 400 may proceed to a step 430.

At the step 410, the intermediary mapping and de-identification system may generate a fully mapped non-standard dataset.

At step 412, the intermediary mapping and de-identification system may infer the one or more variable classifications for the fully mapped dataset by using the ruleset and/or the variable type container.

At step 414, the intermediary mapping and de-identification system may infer the one or more variable connections and the one or more groupings for the fully mapped dataset by using the ruleset and/or the variable type container.

At step 416, the intermediary mapping and de-identification system may infer the one or more disclosure risk settings for the fully mapped dataset by using the ruleset and/or the variable type container. Further, the intermediary mapping and de-identification system may perform a disclosure risk assessment to measure a disclosure risk associated with the fully mapped dataset using data such as, but not limited to, the fully mapped dataset, the mapped metadata, the inferred one or more variable classifications, the inferred one or more variable connections, the inferred one or more groupings, the inferred one or more disclosure risk settings, and so forth.

At step 418, the intermediary mapping and de-identification system may infer one or more variable de-identification settings for the fully mapped dataset.

At step 420, the intermediary mapping and de-identification system may perform a de-identification and a de-identification propagation using data such as, but not limited to, the fully mapped dataset, the mapped one or more metadata, the inferred one or more variable classifications, the inferred one or more variable connections, the inferred one or more groupings, the inferred one or more disclosure risk settings, the inferred one or more de-identification settings, and so forth. Further, the de-identification may be, but not limited to, a data transformation, a data masking, a cell-based and/or column-based suppression, a data synthesis, and so forth. Further, the mapping may be used to ensure the de-identification that may further ensure that a synthesized information is correctly imputed and performed at, but not limited to, a cell-level, a column-level, a greater level, and so forth. Furthermore, the mapping may be used to extend and/or propagate the de-identification, including the synthesized information, across one or more fields to properly account for the one or more connections and/or one or more correlations. In an exemplary scenario, in a case of data synthesis (synthetic data creation as part of de-identification), the mapping may guide the synthesis and an imputation within and across one or more fields and/or one or more variables.

At step 422, the intermediary mapping and de-identification system may store the de-identified fully mapped dataset onto the database 114, in an embodiment of the present invention. In another embodiment of the present invention, the intermediary mapping and dc-identification system 100 may generate an output comprising the de-identified fully mapped dataset.

At the step 424, if the intermediary mapping and de-identification system determines that the retrieved non-standard dataset can be mapped to a standard schema of the target standard, then the process 400 may proceed to a step 426, otherwise the process 400 may proceed to a step 428. In other words, it is determined whether it is possible to map non-standard datasets to a standard schema of the target standard.

At the step 426, the intermediary mapping and de-identification system may map the retrieved non-standard dataset to the standard schema of the target standard. Further, the intermediary mapping and de-identification system may perform a Quality Control (QC) of the mapped dataset. In the case that the non-standard dataset constitutes information extracted from unstructured text data, the intermediary mapping and de-identification system may generate a transient data model to facilitate mapping the retrieved non-standard dataset to the standard schema of the target standard.

At the step 428, the intermediary mapping and de-identification system may generate an alert to notify an analyst to perform operations such as, but not limited to, perform an ETL, select another target standard, update the selected target standard, stop the process 400, and so forth. In an embodiment of the present invention, it may be possible to update the selected target standard, to create a new standard, or create a custom standard derived from the selected target standard, dynamically and continue with the process without stopping.

At the step 430, if the intermediary mapping and de-identification system determines that the retrieved non-standard dataset can be mapped to the standard variables of the target standard, then the process 400 may proceed to a step 432, otherwise the process 400 may proceed to a step 434. It is determined if it is possible to map non-standard variables to standard variables.

At the step 432, the intermediary mapping and de-identification system may map the retrieved non-standard dataset to the standard variables of the target standard. Further, the intermediary mapping and de-identification system may perform a Quality Control (QC) of the mapped dataset.

At the step 434, the intermediary mapping and de-identification system may generate an alert to notify the analyst to perform operations such as, but not limited to, select another target standard, update the selected target standard, stop the process 400, and so forth. In an embodiment of the present invention, it may be possible to update the selected target standard, to create a new standard, or create a custom standard derived from the selected target standard, dynamically and continue with the process without stopping.

FIG. 4 also illustrates (1) mapping datasets to standard variables within a day, (2) inferring variables and de-identification settings in minutes, and (3) performing de-identification in 1-2 days.

Figure 5:
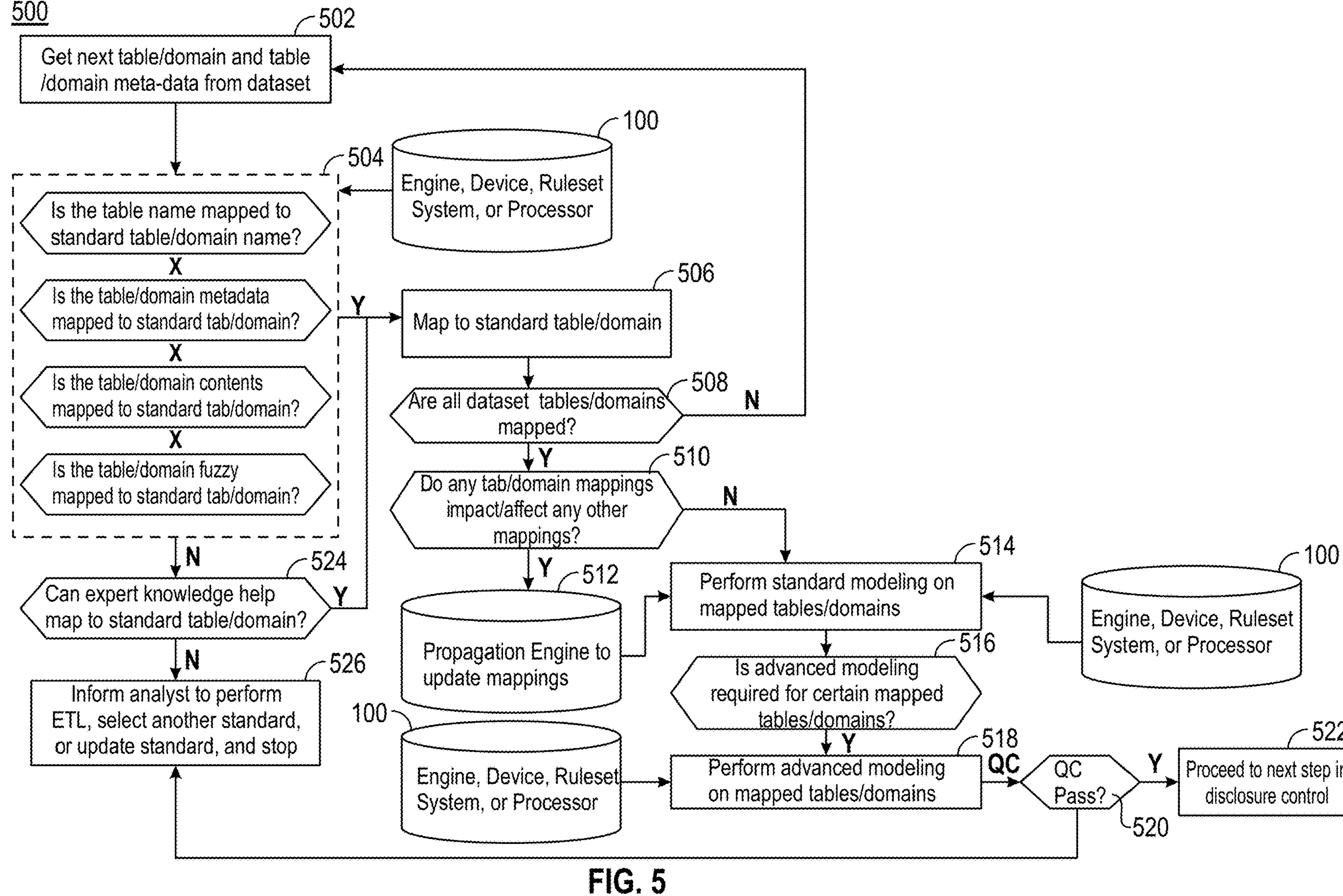
FIG. 5 illustrates a flowchart of a process of a schema mapping performed by the intermediary mapping and de-identification system, according to an embodiment of the present invention.

FIG. 5 illustrates a flowchart of a process 500 of the schema mapping performed by the intermediary mapping and de-identification system (Engine, Device, Ruleset System or Processor) 100, according to embodiments of the present invention.

At step 502, the intermediary mapping and de-identification system Engine, 100 may get a next table and/or domain and a next table and/or domain metadata from the retrieved non-standard dataset. In the case that the non-standard dataset constitutes information extracted from unstructured text data, the intermediary mapping and de-identification system 100 may retrieve a next table and/or domain and a next table and/or domain metadata from a transient data model generated using the extracted information.

At step 504, the intermediary mapping and de-identification system 100 may check a plurality of parameters. In an embodiment of the present invention, the intermediary mapping and de-identification system 100 may be configured to use a rules-based approach to perform the schema mapping based on the next table and/or domain and a next table and/or domain metadata from the retrieved non-standard dataset and/or the synthetic or simulated dataset. In another embodiment of the present invention, the intermediary mapping and de-identification system 100 may be configured to use an Artificial Intelligence (AI) algorithm to perform the schema mapping based on the next table and/or domain and a next table and/or domain metadata from the retrieved non-standard dataset and/or the synthetic or simulated dataset. In another embodiment of the present invention, the intermediary mapping and de-identification system 100 may be configured to perform the schema mapping by comparing the parameters of a next table and/or a domain from the retrieved non-standard dataset and/or the synthetic or simulated dataset with a simulated data. In yet another embodiment of the present invention, the intermediary mapping and de-identification system 100 may be configured to perform the schema mapping by elaborating or extrapolating the parameters of the next table and/or the domain from the retrieved non-standard dataset and/or synthetic or simulated dataset based on the synthetic data. In an exemplary scenario, the parameters of the next table and/or the domain may be incomplete or missing, and a simulation or a data synthesis may be used to complete the parameters such that the mapping becomes possible by the intermediary mapping and de-identification system 100. The parameters may be, but not limited to, the table name mapped to a standard table and/or domain name, the table and/or domain metadata mapped to the standard table and/or domain, the table and/or domain contents mapped to the standard table and/or domain contents, the table and/or domain fuzzy mapped to the standard table and/or domain, incoming variable information, and so forth. In the case that the non-standard dataset constitutes information extracted from unstructured text data, the intermediary mapping and de-identification system 100 may automatically generate parameters for a transient data model built from the extracted information including, but not limited to, table name mapped to a standard table and/or domain name, the table and/or domain metadata mapped to the standard table and/or domain, the table and/or domain contents mapped to the standard table and/or domain contents, the table and/or domain fuzzy mapped to the standard table and/or domain, incoming variable information, and so forth. If the intermediary mapping and de-identification system 100 determines that the parameters are true then the process 500 may process to a step 506, otherwise the process 500 may proceed to a step 524. In effect, a series of questions can be answered. Is the table name mapped to a standard table/domain name, is the table/domain metadata mapped to a standard tab/domain, is the table/domain contents mapped to a standard tab/domain, and is the table/domain fuzzy mapped to a standard tab/domain.

At the step 506, the intermediary mapping and de-identification system 100 may map the next table and/or domain and the next table and/or domain metadata to one or more standard table and/or domain.

At the step 508, if the intermediary mapping and de-identification system 100 determines that all the next table and/or domain and the next table and/or domain metadata are mapped, then the process 500 may proceed to a step 510, otherwise the process 500 may return to the step 502.

At the step 510, if the intermediary mapping and de-identification system 100 determines that next table and/or domain and the next table and/or domain metadata affects any one or more other mappings, then the process 500 may proceed to a step 512, otherwise the process 500 may proceed to a step 514.

At the step 512, the intermediary mapping and de-identification system 100 may enable a propagation engine (not shown) to update the mappings. In an exemplary scenario, if a Lowest Level Term (LLT) of a clinical trial encounters an impact then the intermediary mapping and de-identification system 100 may enable the propagation engine to update a Preferred Term (PT), a High Level Term (HLT), a High Level Group Term (HLGT), and a System Organ Class (SOC). In another exemplary scenario, if HLT of the clinical trial encounters the impact then the intermediary mapping and de-identification system 100 may enable the propagation engine to update the HLGT, and the SOC, on the other hand the intermediary mapping and de-identification system 100 may not measure risk at the LLT and the PT.

At the step 514, the intermediary mapping and de-identification system 100 may perform standard modeling on the mapped table and/or domain.

At step 516, if the intermediary mapping and de-identification system 100 determines that an advanced modeling is required for certain mapped tables and/or domain, then the process 500 may proceed to a step 518. The question is answered as to whether advanced modeling is required for certain mapped tables/domains.

At the step 518, the intermediary mapping and de-identification system 100 may perform the advanced modeling on the mapped tables and/or domains. Further, the intermediary mapping and de-identification system 100 may perform a Quality Control (QC) on the mapped tables and/or domain.

At step 520, if the intermediary mapping and de-identification system 100 determines that the QC is passed, then the process 500 may proceed to a step 522, otherwise the process 500 may proceed to a step 526.

At the step 522, the intermediary mapping and de-identification system 100 may proceed to a next step in a disclosure control.

At the step 524, if the intermediary mapping and de-identification system 100 determines that an expert knowledge is required to and can help map to the standard table and/or domain, then the process 500 may proceed to the step 506, otherwise the process 500 may proceed to the step 526. In an embodiment of the present invention, the mapping to standard table and/or domain determined by expert knowledge can be stored by the intermediary mapping and de-identification system 100 for future retrieval.

At the step 526, the intermediary mapping and de-identification system 100 may generate an alert to notify an analyst to perform operations such as, but not limited to, perform an ETL, select another target standard, update the selected target standard, stop the process 400, and so forth. Further, the intermediary mapping and de-identification system 100 may invoke a generation of the synthetic data for a later use in disclosure risk measurement of the mapped non-standard datasets. The synthetic data generation may take as input data from mapped fields to reduce a computational load or a complexity of the disclosure risk measurement, in an embodiment of the present invention. In another embodiment of the present invention, the synthetic data generation may take as input data from unmapped fields as a privacy-enhancing mechanism to limit the amount of Personally Identifying Information (PII) released to a data recipient. In yet another embodiment of the present invention, it may be possible to update the selected target standard, to create a new standard, or create a custom standard derived from the selected target standard, dynamically and continue with the process without stopping.

Figure 6:
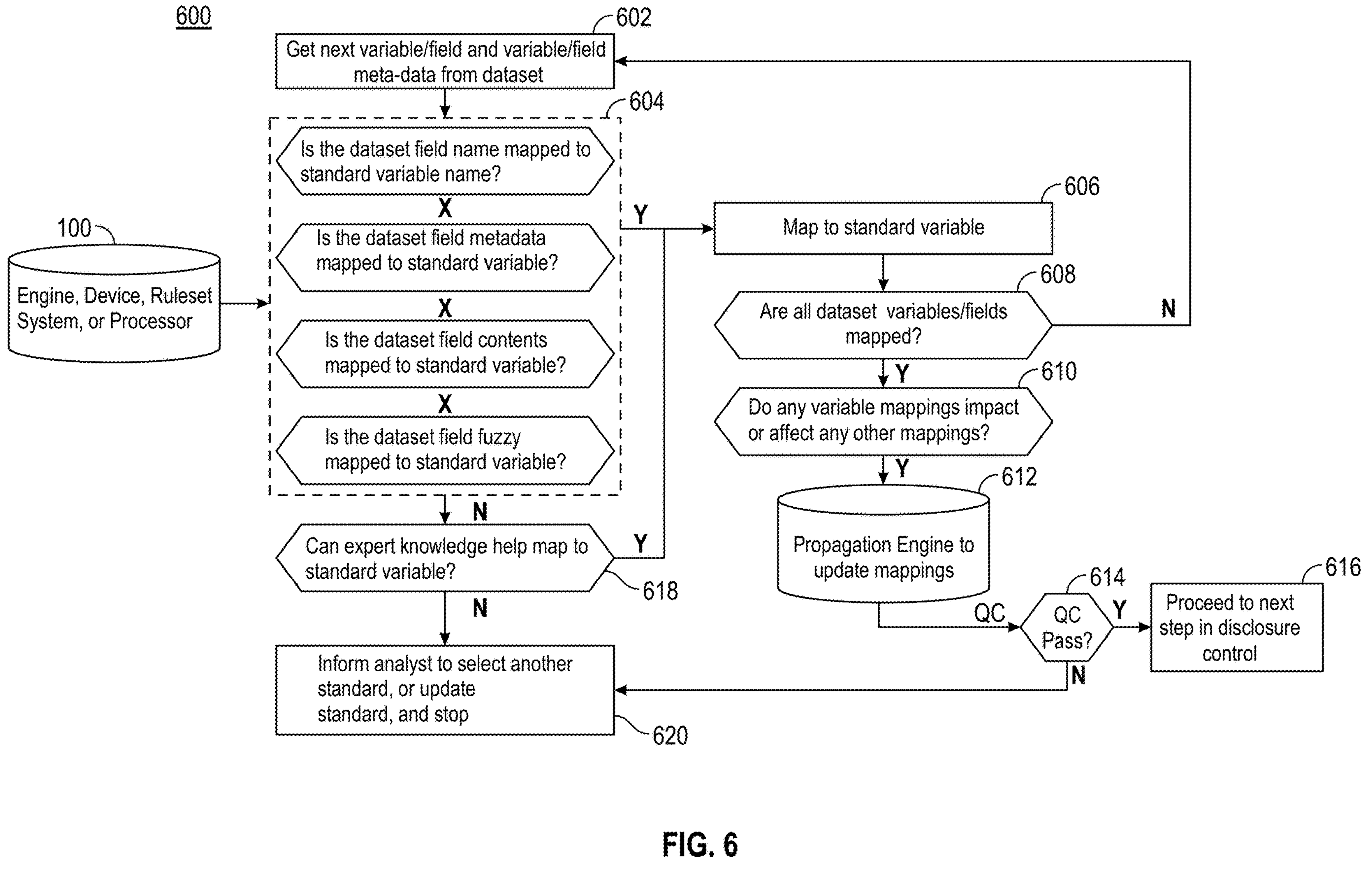
FIG. 6 illustrates a flowchart of a process of a variable mapping performed by the intermediary mapping and de-identification system, according to an embodiment of the present invention.

FIG. 6 illustrates a flowchart of a process 600 of the variable mapping performed by the intermediary mapping and de-identification system 100, according to embodiments of the present invention.

At step 602, the intermediary mapping and de-identification system 100 may get a next variable and/or field and a next variable and/or field metadata from the retrieved non-standard dataset. In the case that the non-standard dataset constitutes information extracted from unstructured text data, the intermediary mapping and de-identification system 100 may get a next variable and/or field and a next variable and/or field metadata from a transient data model built from the extracted information.

At step 604, the intermediary mapping and de-identification system 100 may check a plurality of parameters. In an embodiment of the present invention, the intermediary mapping and de-identification system 100 may be configured to use a rules-based approach to perform the variable mapping based on the next variable and/or field and a next variable and/or field metadata from the retrieved non-standard dataset and/or the synthetic or simulated dataset. In another embodiment of the present invention, the intermediary mapping and de-identification system 100 may be configured to use an Artificial Intelligence (AI) algorithm to perform the variable mapping based on the next variable and/or field and a next variable and/or field metadata from the retrieved non-standard dataset and/or the synthetic or simulated dataset. In another embodiment of the present invention, the intermediary mapping and de-identification system 100 may be configured to perform the variable mapping by comparing the parameters of a next variable and/or a field from the retrieved non-standard dataset and/or the synthetic or simulated dataset with a simulated data. In yet another embodiment of the present invention, the intermediary mapping and de-identification system 100 may be configured to perform the variable mapping by elaborating or extrapolating the parameters of the next variable and/or the field from the retrieved non-standard dataset and/or synthetic or simulated dataset based on the synthetic data. In an exemplary scenario, the parameters of the next variable and/or the field may be incomplete or missing, and a simulation or a data synthesis may be used to complete the parameters such that the mapping becomes possible by the intermediary mapping and de-identification system 100. The parameters may be, but not limited to, the field name mapped to a standard variable name, the field metadata mapped to the standard variable, the field contents mapped to the standard variable, the filed fuzzy mapped to the standard variable, incoming variable information, and so forth. If the intermediary mapping and de-identification system 100 determines that the parameters are true, then the process 600 may process to a step 606, otherwise the process 600 may proceed to a step 618. Various questions are answered. Such questions include: is the dataset field name mapped to a standard variable name, is the dataset field metadata mapped to a standard variable, is the dataset field contents mapped to a standard variable, etc.

At the step 606, the intermediary mapping and de-identification system 100 may map the next variable and/or field and a next variable and/or field metadata to one or more standard variables.

At step 608, if the intermediary mapping and de-identification system 100 determines that all the next variable and/or field and a next variable and/or field metadata are mapped, then the process 600 may proceed to a step 610, otherwise the process 600 may return to the step 602.

At the step 610, if the intermediary mapping and de-identification system 100 determines that next variable and/or field and a next variable and/or field metadata affects and/or impacts any one or more other mappings, then the process 600 may proceed to a step 612. The impact may be on settings, the classifications, or any other aspect of any other variable, in an embodiment of the present invention.

At the step 612, the intermediary mapping and de-identification system 100 may enable a propagation engine (not shown) to update the mappings. In an exemplary scenario, if a Lowest Level Term (LLT) of a clinical trial encounters an impact then the intermediary mapping and de-identification system 100 may enable the propagation engine to update a Preferred Term (PT), a High Level Term (HLT), a High Level Group Term (HLGT), and a System Organ Class (SOC). In another exemplary scenario, if HLT of the clinical trial encounters the impact then the intermediary mapping and de-identification system 100 may enable the propagation engine to update the HLGT, and the SOC, on the other hand the intermediary mapping and de-identification system 100 may not measure risk at the LLT and the PT. Further, the intermediary mapping and de-identification system 100 may perform a Quality Control (QC) on the mapped variable and/or field.

At step 614, if the intermediary mapping and de-identification system 100 determines that the QC is passed, then the process 600 may proceed to a step 616, otherwise the process 600 may proceed to a step 620.

At the step 616, the intermediary mapping and de-identification system 100 may proceed to a next step in a disclosure control.

At the step 618, if the intermediary mapping and de-identification system 100 determines that an expert knowledge is required to and can help map to the standard variable and/or field, then the process 600 may proceed to the step 606, otherwise the process 600 may proceed to the step 620. In an embodiment of the present invention, the mapping to standard variable and/or field determined by expert knowledge can be stored by the intermediary mapping and de-identification system 100 for future retrieval.

At the step 620, the intermediary mapping and de-identification system 100 may generate an alert to notify an analyst to perform operations such as, but not limited to, select another target standard, update the selected target standard, stop the process 600, and so forth. In an embodiment of the present invention, it may be possible to update the selected target standard, to create a new standard, or create a custom standard derived from the selected target standard, dynamically and continue with the process without stopping.

Figure 7:
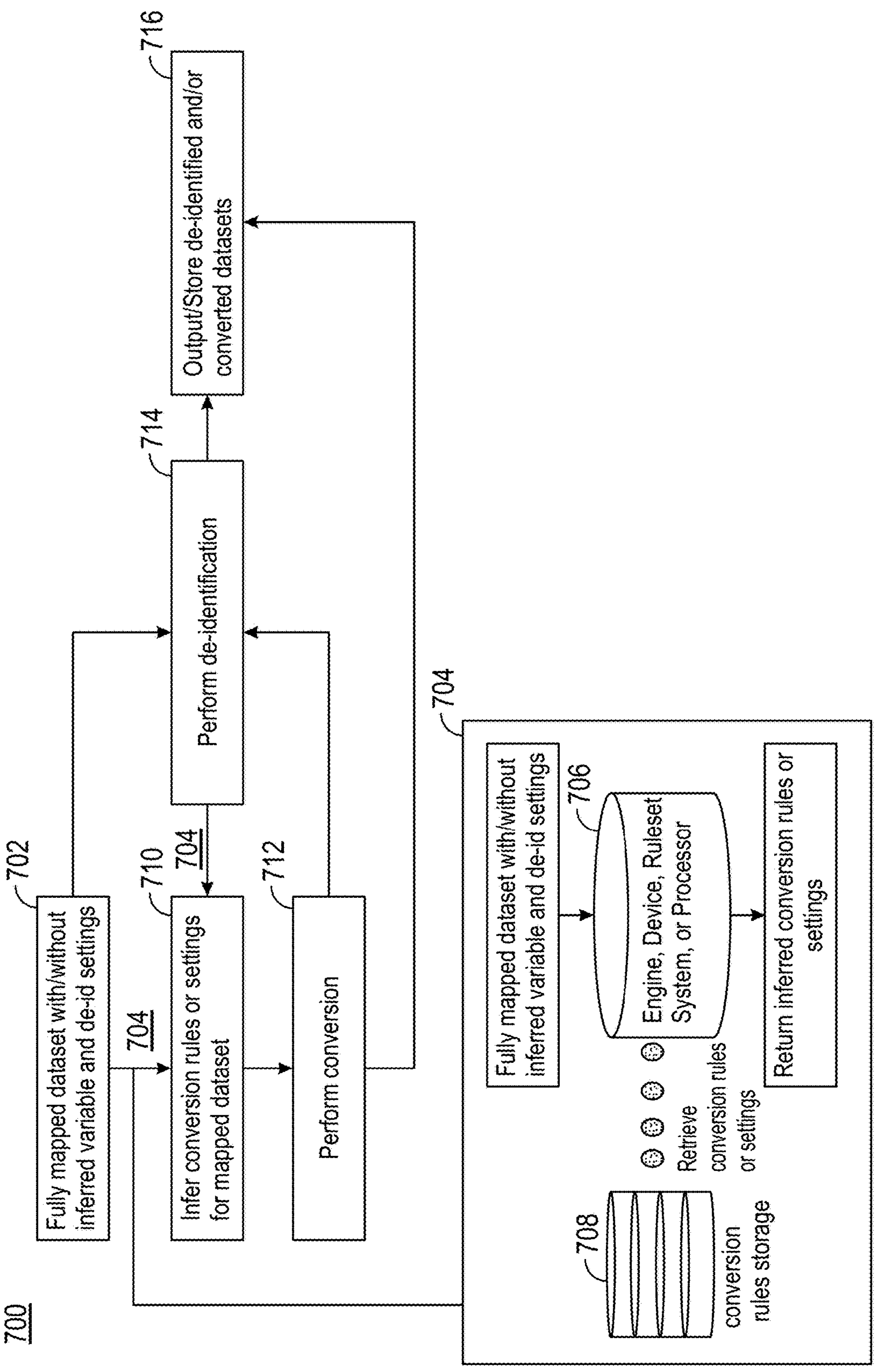
FIG. 7 illustrates a flowchart of an optional extension process of a conversion of mapped dataset performed by the intermediary mapping and de-identification system, according to an embodiment of the present invention.

FIG. 7 illustrates a flowchart of a process 700 of the conversion of mapped dataset performed by the intermediary mapping and de-identification system 100, according to an embodiment of the present invention. The intermediary mapping and de-identification system 100 may be configured to viably and optionally convert one or more mapped datasets to an existing or a new standard, in terms of a schema and/or one or more variables, that may allow a downstream automation or a streamlining of one or more control steps.

At step 702, the intermediary mapping and de-identification system 100 may get a fully mapped dataset with one or more of the inferred variable classifications, the inferred variable risk settings, the inferred variable connections and/or groups, the inferred disclosure risk settings, the inferred variable de-identification settings, or a combination thereof. If the intermediary mapping and de-identification system 100 determines that the conversion of mapped dataset or datasets are required, then the process 700 may proceed to step 710 via the step 704, otherwise the process 700 may proceed to a step 714.

At the step 704, an exemplary ruleset and the ruleset engine may perform inference based on the schema and/or the variable mapping or mappings, according to an embodiment of the present invention. The ruleset engine 706 may access the generated schema and/or the variable mapping or mappings and further infer the variable mapping with, but not limited to, the appropriate the one or more conversion rules, and the one or more conversion settings, and so forth. Further, the ruleset engine 706 may be configured to retrieve the one or more conversion rules, and the one or more conversion settings, and so forth from a rules storage 708. In another embodiment of the present invention, step 704 may be run separately or as a subprocess.

At step 710, the intermediary mapping and de-identification system 100 may infer one or more conversion rules, or one or more of conversion settings for the fully mapped dataset.

At step 712, the intermediary mapping and de-identification system 100 may perform a conversion using data such as, but not limited to, the fully mapped dataset, the mapped one or more metadata, the inferred one or more variable classifications, the inferred one or more variable connections, the inferred one or more groupings, the inferred one or more disclosure risk settings, the inferred one or more de-identification settings, the inferred one or more conversion rules, the inferred one or more conversion settings, and so forth. If the intermediary mapping and de-identification system 100 determines that the de-identification of the converted mapped dataset or datasets are required, then the process 700 may proceed to step 714, otherwise the process 700 may proceed to a step 716.

At step 714, the intermediary mapping and de-identification system 100 may perform a de-identification and a dc-identification propagation using data such as, but not limited to, the fully mapped dataset, the mapped one or more metadata, the inferred one or more variable classifications, the inferred one or more variable connections, the inferred one or more groupings, the inferred one or more disclosure risk settings, the inferred one or more de-identification settings, and so forth. Further, the dc-identification may be, but not limited to, a data transformation, a data masking, a cell-based and/or column-based suppression, a data synthesis, and so forth. Further, the mapping may be used to ensure the de-identification that may further ensure that a synthesized information is correctly imputed and performed at, but not limited to, a cell-level, a column-level, a greater level, and so forth. Furthermore, the mapping may be used to extend and/or propagate the de-identification, including the synthesized information, across one or more fields to properly account for the one or more connections and/or one or more correlations. In an exemplary scenario, in a case of data synthesis (synthetic data creation as part of de-identification), the mapping may guide the synthesis and an imputation within and across one or more fields and/or one or more variables. If the intermediary mapping and de-identification system 100 determines that the conversion of mapped dataset or datasets are required, then the process 700 may proceed to step 710 via the step 704, otherwise the process 700 may proceed to a step 716.

At step 716, the intermediary mapping and de-identification system 100 may store the de-identified and/or converted fully mapped dataset onto the database 114, in an embodiment of the present invention. In another embodiment of the present invention, the intermediary mapping and de-identification system 100 may generate an output comprising the de-identified and/or converted fully mapped dataset.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed.

Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

What is claimed is:

1. A computer-implemented method comprising:

retrieving one or more datasets and one or more metadata from a data source;

mapping the retrieved one or more datasets and the one or more metadata to a target standard;

inferring one or more variable classifications, one or more variable connections, and one or more groupings using the mapped one or more datasets and the mapped one or more metadata;

performing a de-identification process on the one or more datasets using the inferred one or more variable classifications, the inferred one or more variable connections, and the inferred one or more groupings;

performing a conversion of the one or more datasets to the target standard using the inferred one or more variable classifications, the inferred one or more variable connections, and the inferred one or more groupings; and generating an output comprising the converted one or more datasets.

2. The computer-implemented method of claim 1, wherein the performing the de-identification process is performed based on a determination that the de-identification process is required.

3. The computer-implemented method of claim 1, wherein the de-identification process includes data transformation, data masking, and data synthesis with respect to the one or more datasets.

4. The computer-implemented method of claim 1, further comprising storing the converted one or more datasets within a database.

5. The computer-implemented method of claim 1, wherein the performing the conversion is based on a determination that the conversion of the one or more datasets to the target standard is required.

6. The computer-implemented method of claim 1, wherein the inferring is based on a schema associated with the target standard.

7. The computer-implemented method of claim 1, wherein the inferring is based on a variable mapping associated with the target standard.

8. The computer-implemented method of claim 1, further comprising performing a disclosure risk assessment with respect to the one or more datasets.

9. The computer-implemented method of claim 1, further comprising transmitting the output comprising the converted one or more datasets by way of a communication network to a computing device.

10. The computer-implemented method of claim 1, wherein performing the de-identification process comprises propagating the de-identification process across one or more fields of the one or more datasets based on the inferred one or more variable connections and the inferred one or more groupings.

11. A system comprising:

one or more processors; and one or more non-transitory computer-readable storage media storing instructions which, when executed by the one or more processors, cause the one or processors to perform operations comprising:

retrieving one or more datasets and one or more metadata from a data source;

mapping the retrieved one or more datasets and the one or more metadata to a target standard;

inferring one or more variable classifications, one or more variable connections, and one or more groupings using the mapped one or more datasets and the mapped one or more metadata;

performing a de-identification process on the one or more datasets using the inferred one or more variable classifications, the inferred one or more variable connections, and the inferred one or more groupings;

performing a conversion of the one or more datasets to the target standard using the inferred one or more variable classifications, the inferred one or more variable connections, and the inferred one or more groupings; and generating an output comprising the converted one or more datasets.

12. The system of claim 11, wherein the performing the de-identification process is performed based on a determination that the de-identification process is required.

13. The system of claim 11, wherein the de-identification process includes data transformation, data masking, and data synthesis with respect to the one or more datasets.

14. The system of claim 11, wherein the operations further comprise storing the converted one or more datasets within a database.

15. The system of claim 11, wherein the performing the conversion is based on a determination that the conversion of the one or more datasets to the target standard is required.

16. The system of claim 11, wherein the inferring is based on a schema associated with the target standard.

17. The system of claim 11, wherein the inferring is based on a variable mapping associated with the target standard.

18. The system of claim 11, further comprising performing a disclosure risk assessment with respect to the one or more datasets.

19. The system of claim 11, wherein the operations further comprise transmitting the output comprising the converted one or more datasets by way of a communication network to a computing device.

20. A non-transitory computer-readable medium storing instructions that, when executed, direct a processor of a computing device to perform operations comprising:

retrieving one or more datasets and one or more metadata from a data source;

mapping the retrieved one or more datasets and the one or more metadata to a target standard;

inferring one or more variable classifications, one or more variable connections, and one or more groupings using the mapped one or more datasets and the mapped one or more metadata;

performing a de-identification process on the one or more datasets using the inferred one or more variable classifications, the inferred one or more variable connections, and the inferred one or more groupings;

performing a conversion of the one or more datasets to the target standard using the inferred one or more variable classifications, the inferred one or more variable connections, and the inferred one or more groupings; and generating an output comprising the converted one or more datasets.

* * * * *